United States Patent
Lofstrom et al.

(10) Patent No.: US 10,576,699 B2
(45) Date of Patent: Mar. 3, 2020

(54) BOND FIXTURE FOR ROOT END LAMINATE OR ROTOR BLADE

(71) Applicant: Sikorsky Aircraft Corporation, Stratford, CT (US)

(72) Inventors: Sven Roy Lofstrom, Irving, TX (US); Ryan Lehto, Crowley, TX (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 96 days.

(21) Appl. No.: 15/232,265

(22) Filed: Aug. 9, 2016

(65) Prior Publication Data

US 2018/0043640 A1    Feb. 15, 2018

(51) Int. Cl.
| | |
|---|---|
| B64F 5/40 | (2017.01) |
| B64F 5/10 | (2017.01) |
| B29C 70/44 | (2006.01) |
| B64C 27/32 | (2006.01) |
| B29L 31/08 | (2006.01) |

(52) U.S. Cl.
CPC ............ B29C 70/44 (2013.01); B64C 27/32 (2013.01); *B29L 2031/082* (2013.01)

(58) Field of Classification Search
CPC ....... B29C 70/44; B64C 27/32; B64F 5/0009; B29L 2031/082
USPC .......................................................... 156/60
See application file for complete search history.

(56) References Cited

U.S. PATENT DOCUMENTS

| | | | | |
|---|---|---|---|---|
| 3,607,545 A | * | 9/1971 | Parsons ................. | B64C 27/473 156/311 |
| 3,996,091 A | * | 12/1976 | Daunt .................... | B29C 33/02 156/285 |
| 4,083,656 A | | 4/1978 | Braswell et al. | |
| 4,251,309 A | | 2/1981 | Class et al. | |
| 4,362,588 A | * | 12/1982 | Anton .................... | B23P 15/04 156/219 |
| 4,449,703 A | * | 5/1984 | Robinson ............... | B23P 15/04 269/152 |
| 4,855,011 A | | 8/1989 | Legge et al. | |
| 5,520,532 A | * | 5/1996 | Reinfelder ............. | B29C 70/44 249/134 |
| 5,862,576 A | | 1/1999 | Leahy et al. | |
| 5,939,007 A | * | 8/1999 | Iszczyszyn ............ | B29C 70/32 264/258 |
| 6,245,273 B1 | * | 6/2001 | Wendler, Jr. ......... | B29C 59/046 156/199 |
| RE37,774 E | | 7/2002 | Leahy et al. | |
| 9,144,944 B1 | | 9/2015 | White | |
| 2005/0141995 A1 | * | 6/2005 | Logan .................. | B64C 27/473 416/134 A |

* cited by examiner

*Primary Examiner* — Michael N Orlando
*Assistant Examiner* — Christian Roldan
(74) *Attorney, Agent, or Firm* — Cantor Colburn LLP (57) ABSTRACT

A bond assembly includes a fixture having a first section movably coupled to a second section. The first section and the second section are disposed opposite one another. A bladder assembly is mounted to at least one of the first section and the second section. The bladder assembly is configured to apply controlled, localized pressure and heat to a component receivable between the first section and the second section.

9 Claims, 8 Drawing Sheets

BOND FIXTURE FOR ROOT END LAMINATE OR ROTOR BLADE

BACKGROUND OF THE INVENTION

The subject matter disclosed herein generally relates to a rotor blade of a rotary-wing aircraft, and more particularly, to a system and method for bonding a laminate of a rotor blade.

Various components, such as a rotor blade of a rotary wing aircraft for example, have a plurality of holes grouped together in a hole pattern. Although the hole pattern on each rotor blade is substantially identical, the position of one or more of the holes of the pattern may vary slightly between rotor blades due to the allowable tolerances. In some instances, a component is mounted to the surface of the rotor blade adjacent the hole pattern. As a result, the hole pattern must be formed in both the component and the rotor blade.

During initial manufacturing of the rotor blade, the hole pattern may be formed in the component and the rotor blade simultaneously such that alignment between the component and the rotor blade is not an issue. However, over time, the component may wear and eventually need replacing. The hole pattern of the replacement component must maintain concentricity with the existing hole pattern of the blade when the replacement component is bonded thereto.

BRIEF DESCRIPTION OF THE INVENTION

According to one embodiment of the invention, a bond assembly includes a fixture having a first section movably coupled to a second section. The first section and the second section are disposed opposite one another. A bladder assembly is mounted to at least one of the first section and the second section. The bladder assembly is configured to apply controlled, localized pressure and heat to a component receivable between the first section and the second section.

In addition to one or more of the features described above, or as an alternative, in further embodiments the bladder assembly includes a heater.

In addition to one or more of the features described above, or as an alternative, in further embodiments the heater is mountable to an exterior surface of the component receivable within the bond assembly.

In addition to one or more of the features described above, or as an alternative, in further embodiments the heater includes a plurality of regions and a heat output from each of the plurality of regions is substantially identical.

In addition to one or more of the features described above, or as an alternative, in further embodiments the heater includes a plurality of regions and a heat output from at least one of the plurality of regions is different.

In addition to one or more of the features described above, or as an alternative, in further embodiments comprising a rigid caul plate positioned between the bladder assembly and the adjacent surface.

In addition to one or more of the features described above, or as an alternative, in further embodiments the first section and the second section are coupled by at least one threaded fastener and rotation of the at least one threaded fastener about an axis causes the first section to move relative to the second section.

In addition to one or more of the features described above, or as an alternative, in further embodiments comprising a second fixture, separated from the fixture by a distance.

In addition to one or more of the features described above, or as an alternative, in further embodiments a position of the second fixture is adjustable relative to the fixture.

In addition to one or more of the features described above, or as an alternative, in further embodiments the component is a rotor blade.

According to another embodiment, a method of bonding a laminate to a rotor blade includes installing the laminate about a surface of the rotor blade and positioning the rotor blade within a fixture. The rotor blade is secured within the fixture and one or more bond cycles including applying localized and controlled heat and pressure to the laminate are performed via the fixture.

In addition to one or more of the features described above, or as an alternative, in further embodiments the fixture includes a first fixture and a second fixture and the method further comprises adjusting a relative position between the first fixture and the second fixture.

In addition to one or more of the features described above, or as an alternative, in further embodiments comprising installing a caul plate in overlapping arrangement with the laminate.

In addition to one or more of the features described above, or as an alternative, in further embodiments securing the rotor blade within the fixture includes moving a first section of the fixture relative to a second section of the fixture to position at least one bladder assembly in contact with the rotor blade.

In addition to one or more of the features described above, or as an alternative, in further embodiments comprising connecting a power supply to the fixture to apply heat to the laminate.

In addition to one or more of the features described above, or as an alternative, in further embodiments comprising connecting an air supply to the fixture to apply controlled pressure to the laminate.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
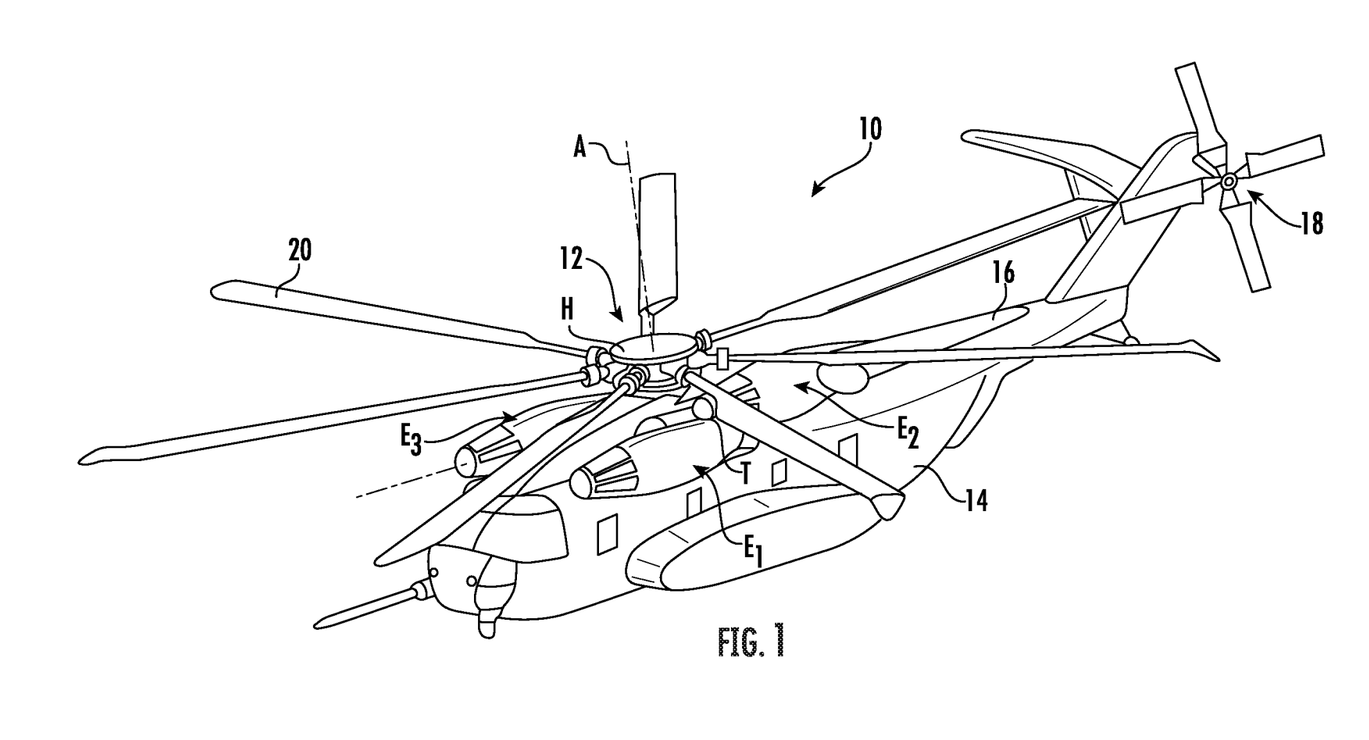
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system for example. The main rotor assembly 12 is driven about an axis of rotation A through a main gearbox (illustrated schematically at T) by one or more engines E. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary-wing aircraft with supplemental translational thrust systems, dual contra-rotating, coaxial rotor system aircraft, turbo-props, tilt-rotors, and tilt-wing aircraft are also within the scope of the invention.

Figure 2:
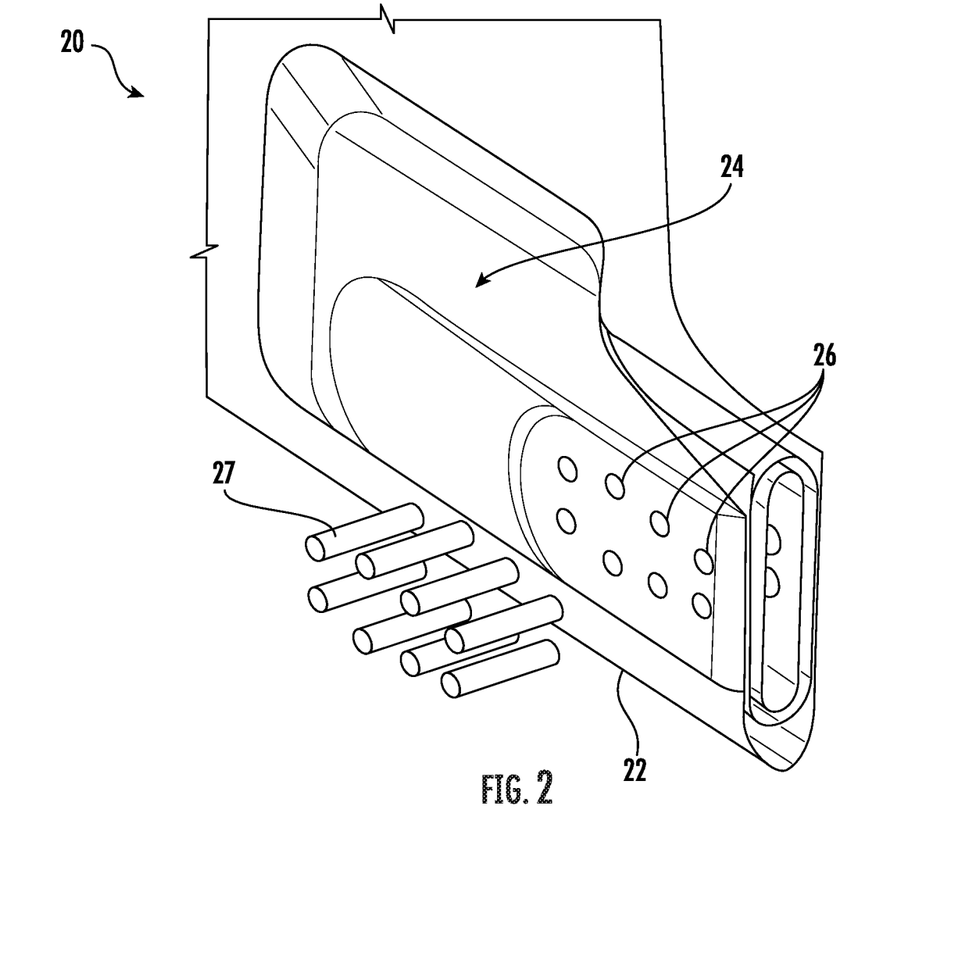
FIG. 2 is a perspective view of a laminate of a rotor blade of a rotary wing aircraft.
Figure 3:
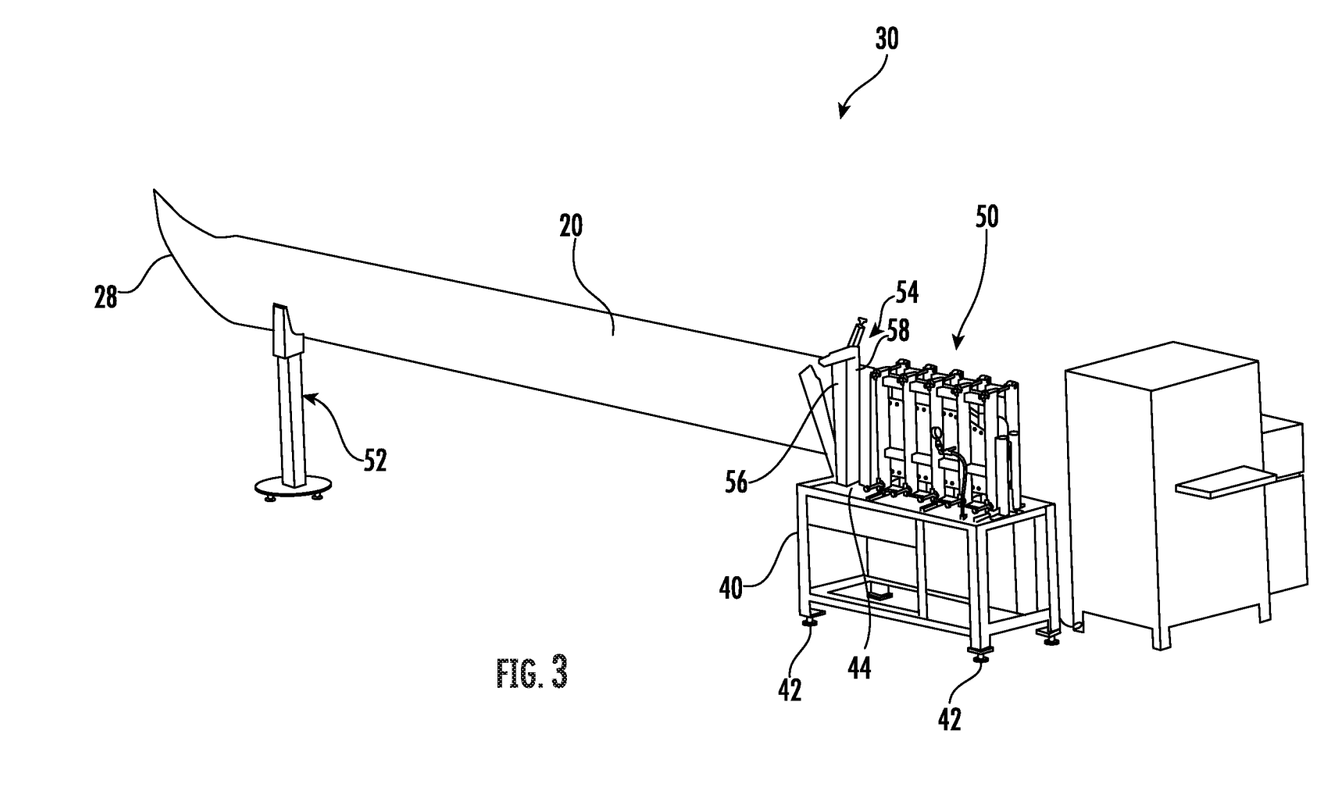
FIG. 3 is a perspective view of a bonding assembly for bonding a laminate to a rotor blade according to an embodiment.

An example of a laminate 24, typically mounted at a root end 22 of a rotor blade assembly is illustrated in FIG. 2. A plurality of holes 26 formed in the laminate 24 is configured to align with corresponding openings (not shown) formed in the rotor blade 20. A plurality of alignment pins 27 arranged within the holes 26 act as tool to position the laminate relative to the rotor blade 20.

With reference now to FIGS. 3-8, an example of a bonding assembly 30 for bonding the laminate 24 to the rotor blade 20 such that the holes 26 of the laminate 24 are properly aligned with the rotor blade 20 is illustrated. As shown, the bond assembly 30 includes a table 40 having a plurality of feet 42 configured to rest on or couple to a floor with one or more fasteners (not shown). An upper surface 44 of the table 40 is arranged generally level to the floor, such as at an ergonomic height for example.

Figure 8:
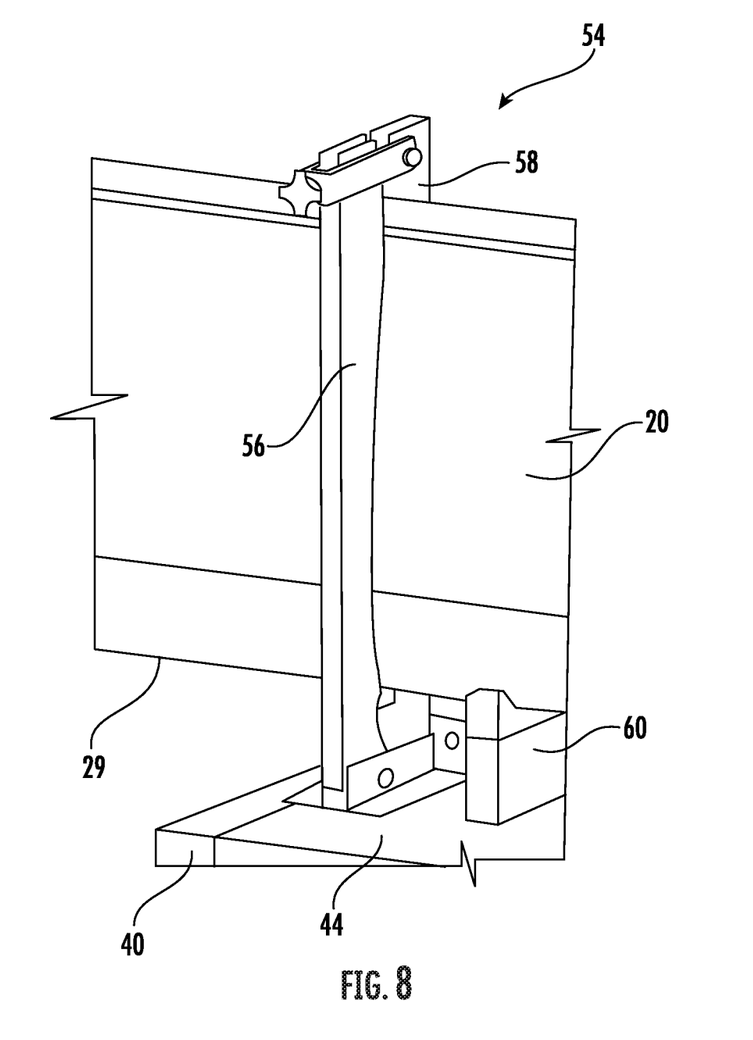
FIG. 8 is a perspective view of a nesting assembly according to an embodiment.

A first fixture 50 is attached to the table 40 and is configured to receive the root end 22 of the rotor blade 20 therein. In the illustrated, non-limiting embodiment of FIG. 3, the bonding assembly 30 additionally includes a tip end fixture 52, separated from the first fixture 50 by a distance, and configured to receive a portion of the rotor blade 20, such as an outboard end 28 thereof, near the blade tip for example. A contour of the second fixture 52 is generally complementary to the portion of the rotor blade 20 received therein. In addition, one or both of the fixtures 50, 52 may be configured to telescope about a vertical axis, such that the rotor blade 20 is generally rotatable about an axis disposed at the inboard end thereof. It is understood that, in other aspects, other numbers of fixtures could be used according to the need to support the rotor blade As best shown in FIG. 8, a nesting assembly 54 having one or more contours complementary to the rotor blade 20 is configured to at least partially support the rotor blade 20 when mounted in the assembly 54. The nesting assembly 54 is positioned between the first fixture 50 and the second fixture 52 and may include two corresponding halves 56, 58 configured to clamp about the rotor blade 20. Alternatively, or in addition, a leading edge support 60, similar to the second fixture, and having a contour complementary to the leading edge 29 of the rotor blade 20, may be mounted to the table 40 for the rotor blade 20 to rest thereon.

Figure 6:
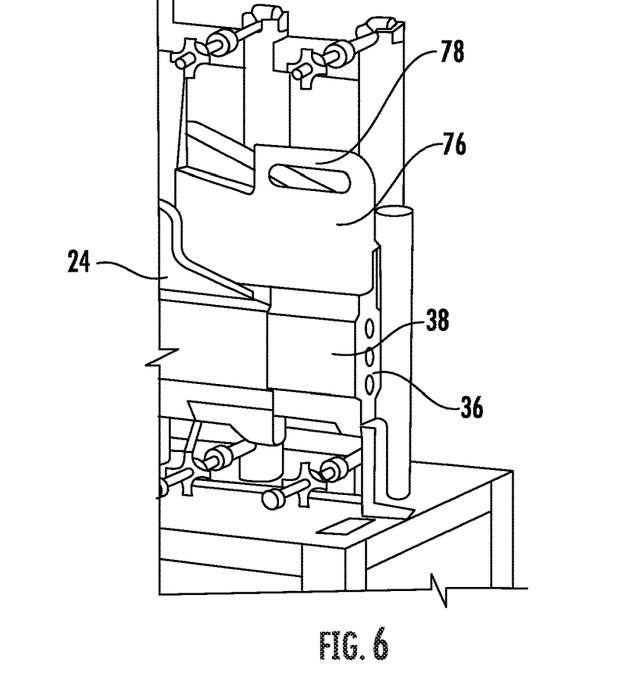
FIG. 6 is a perspective view of a support block assembly according to an embodiment
Figure 7:
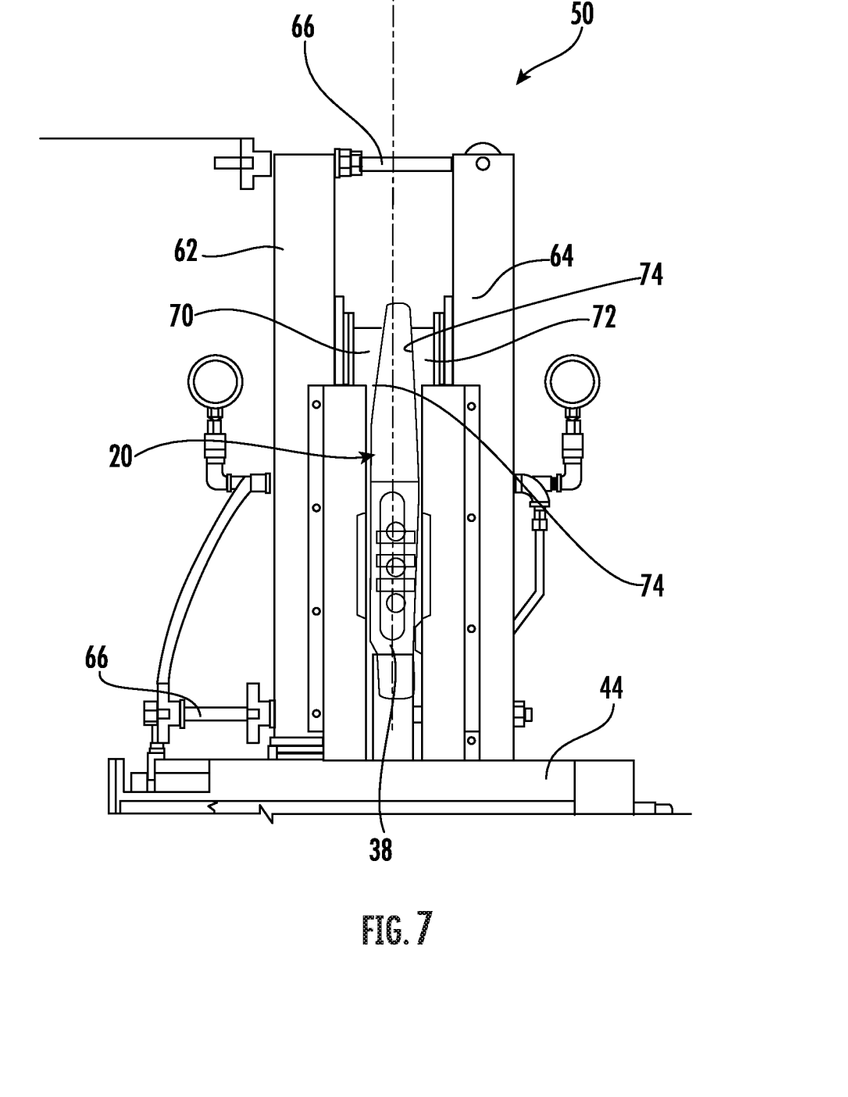
FIG. 7 is an root end view of a the rotor blade positioned within the bonding assembly according got an embodiment.

The first fixture 50 is illustrated in more detail in FIGS. 6 and 7. The fixture 50 is generally equal in length to the root end 22 and includes a first section 62 and a second section 64 configured to cooperate in a manner similar to a vice. The first section 62 and the second section 64 are connected by one or more threaded fasteners 66. The first section 62 is movably mounted to the table 40 such that as the threaded fasteners 66 are rotated, the spacing between the first and second sections 62, 64 is adjusted.

Extending from the first section 62 of the first fixture 50 is at least one first bladder assembly 70 configured to apply pressure to a first surface of the rotor blade 20 and extending from the second section 64 of the fixture 50 is at least one second bladder assembly 72 configured to apply pressure to a second, opposite surface of the rotor blade 20. In embodiments including a plurality of bladder assemblies 70, 72 extending from a single frame section 62, 64, the plurality to bladder assemblies 70, 72 may be operably coupled or may be independently operated. The portion of the bladder assemblies 70, 72 arranged in contact with the rotor blade 20 may be formed from any suitable material that does not damage the surface of the rotor blade 20 when applying pressure thereto. In an embodiment, the bladder assemblies 70, 72 have a contour complementary to a corresponding surface of the blade 20 to apply a uniform pressure thereto.

In an embodiment, the surfaces of the bladders 70, 72 configured to apply a pressure to the rotor blade 20 include a multi-zoned heater blanket or other heating element 74 for applying a heat to the rotor blade 20 during the curing process. Depending on the construction of the heater blanket 74, the heat output from the heater blanket 74 may be constant, or may vary across at least one of the span and the chord of the rotor blade 20. In addition, a contour plate (not shown) generally complementary to the laminate 24, such as a caul plate formed from a thin aluminum material for example, may be positioned between each bladder 70, 72 and the laminate 24 to evenly distribute the heat and pressure applied to the rotor blade 20 via the bladders 70, 72. In addition, a material, such as rubber for example, may be positioned about a periphery of the caul plates to provide additional contact pressure in the thin composite regions of laminate 24.

In an embodiment, a support block assembly 76, shown in FIG. 6, is configured to mount to an edge of the laminate 24 at the inboard end 36 of the rotor blade 20. A portion of the support block assembly 76 has a contour corresponding to an adjacent portion of the laminate 24. In addition, the support block assembly 76, may include a handle 78 to allow a user to easily manipulate and position the support block assembly 76 relative to the rotor blade 20. In addition, the support block assembly 76 may include an alignment feature (not shown), such as a tab that connects to the interior surface at the root end 36 of the rotor blade 20, within the blade spar 38 for example. The alignment feature is configured to associate the support block assembly 76 with the rotor blade 20 and maintain the laminate 24 in the correct position during installation within the assembly 30.

Figure 4A:
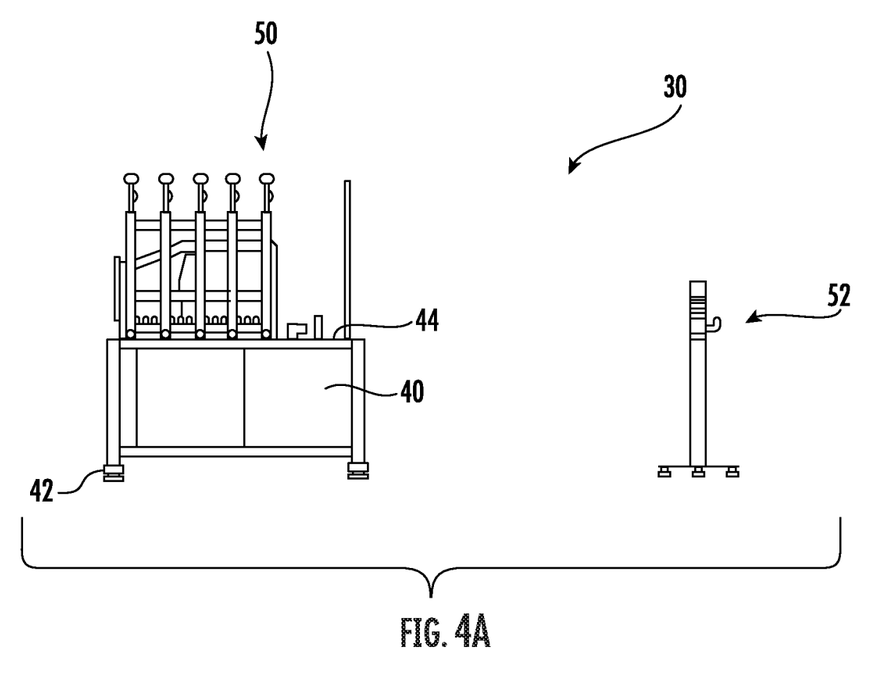
FIGS. 4a and 4b are various views of the bonding assembly for bonding a laminate to a rotor blade according to an embodiment.
Figure 4B:
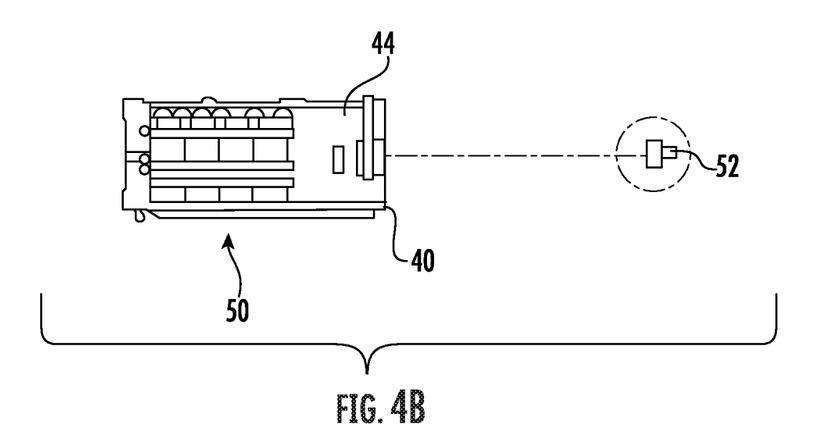
Figure 5:
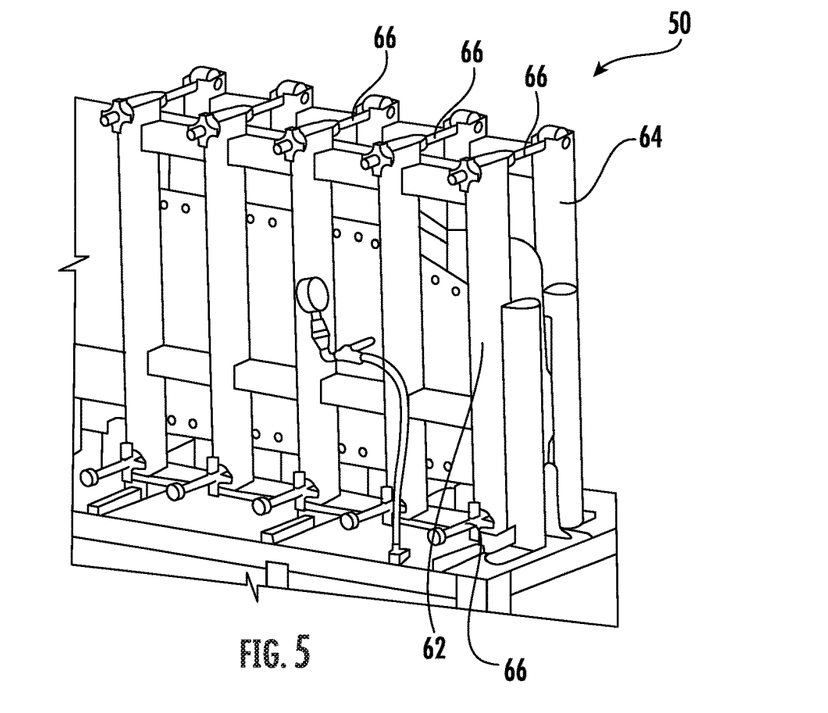
FIG. 5 is a perspective view of a first fixture of the bonding assembly according to an embodiment.
Figure 9:
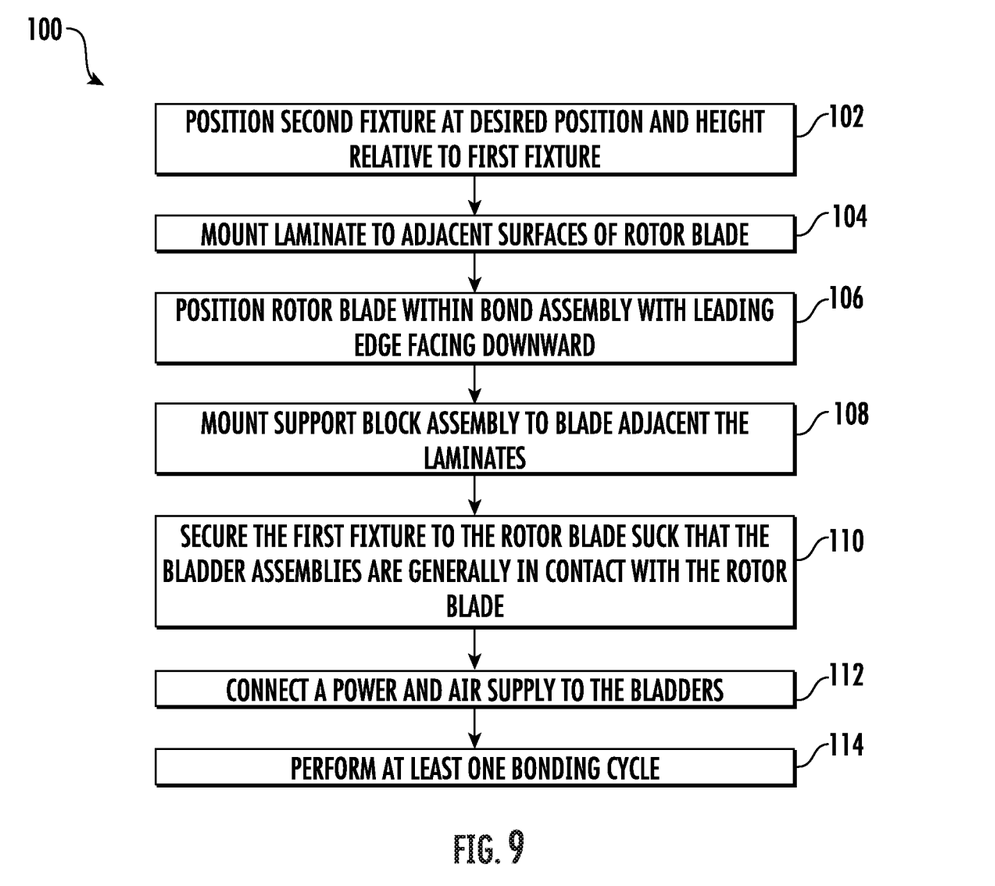
FIG. 9 is a method of using the bonding assembly to bond a laminate to a rotor blade according to an embodiment.

A method 100 of bonding a laminate 24 to a rotor blade 20, shown in FIG. 9, includes adjusting a position of the second fixture 52 relative to the first fixture 50 in block 102. In an embodiment, the position of the second fixture 52 is measured using a laser level positioned on the table 40 supporting the first fixture 50, as shown in FIGS. 4a and 4b. In block 104, the laminate 24 is positioned adjacent the rotor blade, and a plurality of alignment pins 27 are inserted into the alignment holes 26 formed in the laminate 24 and a caul plate is installed over the laminate 24. Inclusion of the alignment pins 27 prevents adhesive from entering into the alignment holes 26. In an embodiment, the alignments pins have a feature formed on the end thereof, such as a standard square drive for example. Incorporation of the feature makes the pins compatible with a ratchet making the application of torque and/or removal of the pins after the bonding of the laminate 24 easier to perform.

In an embodiment the entire bond area may be covered with a sheet of Teflon® or another suitable plastic material to protect the assembly from adhesive material contacting the fixture surfaces (heaters and bladders). In block 106, the rotor blade 20 is loaded into the assembly, specifically into the first fixture 50 and the second fixture 52 with the leading edge 29 of the rotor blade 20 facing downwards. In block 108, the support block assembly 76 is positioned at the inboard end 36 of the rotor blade 20 such that the alignment feature thereof is inserted into the inner mold line of a cavity formed in the blade spar 38. The blade 20 is then secured within the first fixture, as shown in block 110, by tightening together the first and second portions such that they clamp around the body. In block 112, a power and an air supply are connected to the first fixture. A universal controller operates the heater blanket and the bladders to simultaneously apply pressure and heat to the laminate 24, as shown in block 114. After one or more bonding cycles are complete, the air is removed from the bladders and the bond fixture is removed from the rotor blade, such as in a reverse order as previously described.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A bond assembly for mounting a laminate to a rotor blade comprising:
   a fixture including a first section movably coupled to a second section, the first section and the second section being disposed opposite one another;
   a bladder assembly mounted to at least one of the first section and the second section, wherein the bladder assembly is configured to apply controlled, localized pressure and heat to a component receivable between the first section and the second section;
   a rigid caul plate positioned between the bladder assembly and an adjacent surface of the component;
   and a support block assembly including an alignment feature connectable to an interior of the rotor blade, wherein the support block assembly contacts a portion of the laminate to position the laminate relative to the rotor blade and the alignment feature is configured to associate the support block assembly with the rotor blade and maintain the laminate in the correct position during installation within the bond assembly.

2. The bond assembly according to claim 1, wherein the bladder assembly includes a heater.

3. The bond assembly according to claim 2, wherein the heater is mountable to an exterior surface of the component receivable within the bond assembly.

4. The bond assembly according to claim 2, wherein the heater includes a plurality of regions and a heat output from each of the plurality of regions is substantially identical.

5. The bond assembly according to claim 2, wherein the heater includes a plurality of regions and a heat output from at least one of the plurality of regions is different.

6. The bond assembly according to claim 1, wherein the first section and the second section are coupled by at least one threaded fastener and rotation of the at least one threaded fastener about an axis causes the first section to move relative to the second section.

7. The bond assembly according to claim 1, further comprising a second fixture, separated from the fixture by a distance.

8. The bond assembly according to claim 7, wherein a position of the second fixture is adjustable relative to the fixture.

9. The bond assembly according to claim 1, wherein the bladder assembly is contoured to apply localized pressure and heat to rotor blade.

* * * * *